United States Patent
Kobayashi et al.

(10) Patent No.: US 6,310,175 B1
(45) Date of Patent: Oct. 30, 2001

(54) STAR-SHAPED BLOCK COPOLYMER AND PRODUCTION PROCESS THEREFOR

(75) Inventors: Nobuhiro Kobayashi, Takatsuki; Masatoshi Yoshida, Nara, both of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/425,871

(22) Filed: Oct. 23, 1999

(51) Int. Cl.$^7$ ................................................. C08G 75/04
(52) U.S. Cl. ........................... 528/374; 528/376; 528/387
(58) Field of Search ................................... 528/374, 376, 528/387

(56) References Cited

U.S. PATENT DOCUMENTS

| | | |
|---|---|---|
| 4,239,875 | 12/1980 | Voronkova et al. . |
| 4,417,029 | 11/1983 | Milkovich . |
| 4,434,261 | 2/1984 | Brugel et al. . |
| 4,503,188 | 3/1985 | Mancinelli . |
| 5,057,619 | 10/1991 | Kumar et al. . |
| 5,093,385 | 3/1992 | Ali . |
| 5,200,436 | 4/1993 | Kumar et al. . |
| 5,294,728 | 3/1994 | Emmons et al. . |
| 5,399,620 | 3/1995 | Niessner et al. . |
| 5,399,642 | 3/1995 | Emmons et al. . |
| 5,498,675 | 3/1996 | Emmons et al. . |
| 5,679,762 | 10/1997 | Yoshida et al. . |
| 5,756,585 | 5/1998 | Teyssie et al. . |
| 5,763,548 | 6/1998 | Matyjaszewski et al. . |
| 5,869,598 | 2/1999 | Yoshida et al. . |

FOREIGN PATENT DOCUMENTS

| | | |
|---|---|---|
| 27 57 429 A1 | 7/1979 | (DE) . |
| 43 28 004 A1 | 2/1995 | (DE) . |
| 0 243 120 A2 | 10/1987 | (EP) . |
| 0 408 420 A1 | 1/1991 | (EP) . |
| 0 541 272 A1 | 5/1993 | (EP) . |
| 0 686 653 A1 | 12/1995 | (EP) . |
| 59-47276 A | 3/1984 | (JP) . |
| 59-189114 A | 10/1984 | (JP) . |
| 59-227967 A | 12/1984 | (JP) . |
| 63-132914 A | 6/1988 | (JP) . |
| 3-54212 A | 3/1991 | (JP) . |
| 3-97735 A | 4/1991 | (JP) . |
| 3-190911 A | 8/1991 | (JP) . |
| 4-227615 A | 8/1992 | (JP) . |
| 5-500827 A | 2/1993 | (JP) . |
| 5-214008 A | 8/1993 | (JP) . |
| 7-179538 A | 7/1995 | (JP) . |
| 10-287721 A | 10/1998 | (JP) . |
| 10287721 | 10/1998 | (JP) . |
| WO 86/00626 A1 | 1/1986 | (WO) . |
| WO 91/00882 A1 | 1/1991 | (WO) . |

OTHER PUBLICATIONS

Kuriyama et al., "Living Radical Polymerization of Methyl Methacrylate with a Tetrafunctional Photoiniferter: Synthesis of a Star Polymer," Polymer Journal, vol. 16, No. 6, p. 511–514, (1984).

Otsu et al., "Living radical polymerization in homogeneous system with phenylazotriphenylmethane as a thermal iniferter," Polymer Bulletin 16, p. 277–284, (1986).

Primary Examiner—James J. Seidleck
Assistant Examiner—Olga Asinovsky (57) ABSTRACT

The present invention provides a new star-shaped block copolymer and a production process therefor, wherein the new star-shaped block copolymer has high heat resistance despite having a low viscosity. It has been found that a new star-shaped block copolymer has high heat resistance wherein the new star-shaped block copolymer comprises a plurality of star-shaped structures 1 in which at least three chain polymer segments 2 are radially extended from a central polyvalent mercaptan segment 3, wherein the star-shaped structures 1 are bonded to each other through a bonding structure 4 at their chain polymer segments. In addition, in a production process for a star-shaped block copolymer comprising the multistep radical polymerization in the presence of a polyvalent mercaptan wherein the elementary steps of the multistep radical polymerization differ in polymerizable monomers as used therein, the improvement according to the present invention is characterized in that at least one of the elementary steps of the multistep radical polymerization involves the joint use of a polyfunctional monomer with the polymerizable monomer.

10 Claims, 1 Drawing Sheet

Fig. 1

STAR-SHAPED BLOCK COPOLYMER AND PRODUCTION PROCESS THEREFOR

BACKGROUND OF THE INVENTION

A. Technical Field

The present invention relates to a new star-shaped block copolymer and a production process therefor, wherein the star-shaped block copolymer exhibits high heat resistance despite having a low viscosity.

B. Background Art

There is a known star-shaped block copolymer that has a structure in which at least three polymer chains are radially extended from a central polyvalent mercaptan segment. This star-shaped block copolymer generally has more excellent heat resistance than simple chain polymers. Herein, the heat resistance means the cohesion or strength of polymers at high temperature, for example, the holding power at high temperature in the field of pressure sensitive adhesives. The increase of the molecular weight is an effective method to enhance the heat resistance. In the case of the simple chain polymers, however, the simple increase of the molecular weight leads to great increase of viscosity and therefore causes problems of workability. In comparison, because of the above structure, the star-shaped block copolymer can have its heat resistance enhanced without so much increase of its viscosity. Thus, the star-shaped block copolymer is favorably used for purposes to which the heat resistance is demanded, such as hot-melt pressure sensitive adhesives.

The star-shaped block copolymer is generally synthesized by a process comprising the multistep radical polymerization which involves the use of a polyvalent mercaptan having a valence of 2 to 6 as an initiator wherein the elementary steps of the multistep radical polymerization differ in polymerizable monomers as used therein (JP-A-07-179538):

Also as to the star-shaped block copolymer, in the case where higher heat resistance is demanded thereto, the above method involving the increase of the molecular weight might enhance the heat resistance in some degree, but the increase of the viscosity would be still so great that problems of workability would occur.

SUMMARY OF THE INVENTION

A. Object of the Invention

An object of the present invention is to provide a new star-shaped block copolymer and a production process therefor, wherein the new star-shaped block copolymer has high heat resistance despite having a low viscosity.

B. Disclosure of the Invention

To solve the above problems, the present inventors diligently studied and variously devised how the star-shaped structure of the star-shaped block copolymer should be. As a result, the inventors led to a thought that if polymers having star-shaped structures got bonded to each other, it might be possible to make them exhibit high heat resistance even without increasing their molecular weights. And the inventors further established a production process for a new star-shaped block copolymer having such a structure and confirmed that the above bonding structure could provide desired results. Thus, the present invention has been completed.

A new star-shaped block copolymer, according to the present invention, comprises a plurality of star-shaped structures in which at least three chain polymer segments are radially extended from a central polyvalent mercaptan segment, wherein the star-shaped structures are bonded to each other at their chain polymer segments.

Although not especially limited, this star-shaped block copolymer preferably has a holding power of not less than 100 minutes, more preferably not less than 1,000 minutes, wherein the holding power is determined by a process including the steps of: preparing a sample by melt-coating a hot-melt pressure sensitive adhesive in a thickness of 25 $\mu$m onto a 38-$\mu$m-thick PET film, wherein the hot-melt pressure sensitive adhesive includes the star-shaped block copolymer; and then attaching the sample onto a stainless steel sheet such that the adhesion area would be 1.27 cm×1.27 cm; and then pressing the sample onto the stainless steel sheet by running a 2-kg-heavy roller thereon back and forth once; and then adjusting the temperature of the product to 60° C. for 30 minutes; and then applying a load of 1 kg to the sample; and then measuring how long the sample has not fallen off from the stainless steel sheet since the application of the load.

A production process for a new star-shaped block copolymer, according to the present invention, comprises the multistep radical polymerization in the presence of a polyvalent mercaptan wherein the elementary steps of the multistep radical polymerization differ in polymerizable monomers as used therein, with the production process being characterized in that at least one of the elementary steps of the multistep radical polymerization involves the joint use of a polyfunctional monomer with the polymerizable monomer.

In this process, although not especially limited, it is preferable that the weight ratio of the polyfunctional monomer to the polyvalent mercaptan (weight of polyfunctional monomer/weight of polyvalent mercaptan) is less than 2, or that the weight ratio of the polyfunctional monomer to the total of the polymerizable monomers (weight of polyfunctional monomer/total weight of polymerizable monomers) is less than 0.05, or that the joint use of the polyfunctional monomer with the polymerizable monomer is involved only in the first radical polymerization step among the elementary steps of the multistep radical polymerization, because these conditions easily prevent the gelation from occurring when producing the new star-shaped block copolymer.

Furthermore, in the above process according to the present invention, although not especially limited, it is preferable that the second radical polymerization step among the elementary steps of the multistep radical polymerization includes the steps of: all at once mixing a polymer solution, resultant from the first radical polymerization step, with a polymerizable monomer which is to be used in the second radical polymerization step; and then polymerizing the resultant mixture in the presence of the polyfunctional monomer, or that the second radical polymerization step among the elementary steps of the multistep radical polymerization includes the step of gradually adding a polymer solution, resultant from the first radical polymerization step, and a polymerizable monomer, which is to be used in the second radical polymerization step, to a vessel to mix them, while polymerizing the resultant mixture in the presence of the polyfunctional monomer. Such a process can easily and surely give the new star-shaped block copolymer that exhibits excellent holding power as specifically defined above.

These and other objects and the advantages of the present invention will be more fully apparent from the following detailed disclosure.

DETAILED DESCRIPTION OF THE INVENTION

Figure 1:
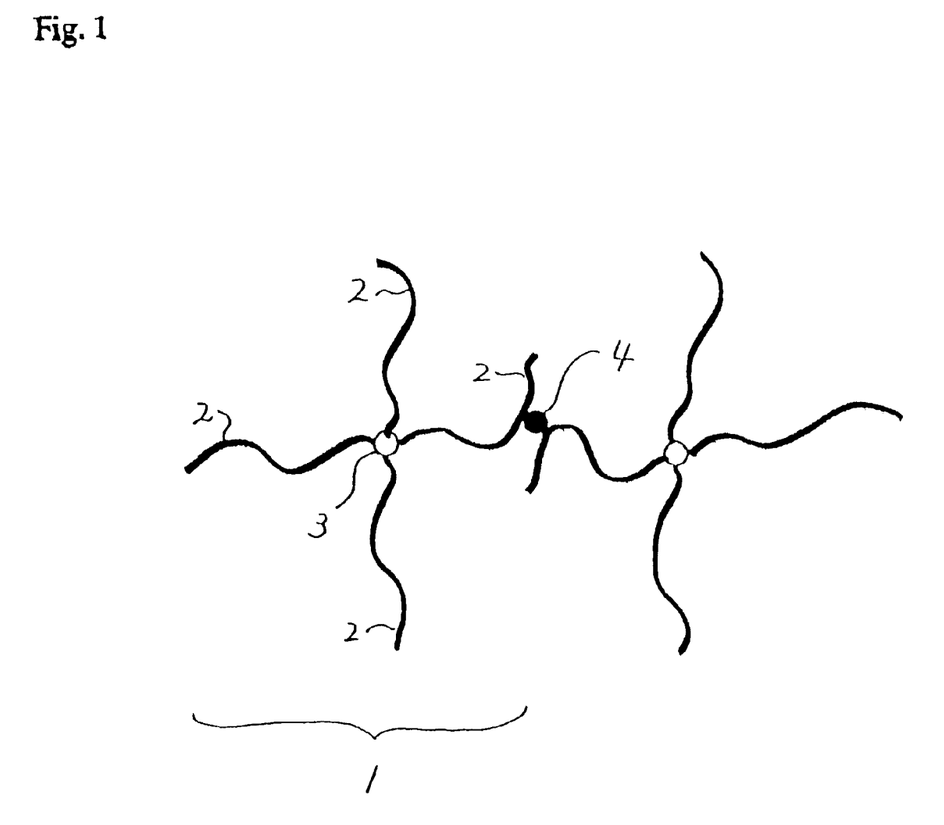
FIG. 1 is a diagram of a model of the new star-shaped block copolymer according to the present invention.

As is shown in FIG. 1, the new star-shaped block copolymer according to the present invention is a star-shaped block copolymer comprising a plurality of star-shaped structures 1 (in FIG. 1, two star-shaped structures 1) in which at least three chain polymer segments 2 (in FIG. 1, four chain polymer segments 2) are radially extended from a central polyvalent mercaptan segment 3, wherein the star-shaped structures 1 are bonded to each other at their chain polymer segments 2. In FIG. 1, the portion where the two star-shaped structures 1, 1 are bonded to each other at their chain polymer segments 2 is marked with a dot, and this portion is a bonding structure 4 as derived from the below-mentioned polyfunctional monomer which is a bonding material.

Although there is no especial limitation, the new star-shaped block copolymer according to the present invention is preferably produced by the below-mentioned process which is the same as the aforementioned. conventional process, comprising the multistep radical polymerization involving the use of the polyvalent mercaptan, except that the polyfunctional monomer is jointly used with the polymerizable monomer in at least one of the elementary steps of the multistep radical polymerization.

If the radical polymerization is carried out in multistep, the new star-shaped block copolymer having at least three different chain polymer segments is obtainable.

In the production process for the new star-shaped block copolymer, according to the present invention, radical polymerization of the first polymerizable monomer is carried out in the presence of the polyvalent mercaptan, when the radical polymerization of the first monomer is initiated with mercapto groups of the polyvalent mercaptan, so that the first monomer forms chain polymer segments of the block copolymer. In this step, some of the mercapto groups of the polyvalent mercaptan remain not initiating this radical polymerization. Thus, next, the second polymerizable monomer is added to carry out the second radical polymerization step, when the radical polymerization of the second monomer is initiated with the residual mercapto groups of the polyvalent mercaptan, so that the second monomer forms chain polymer segments, having compositions different from those of chain polymer segments resultant from the first step, into the star-shaped block. In the present invention, a polyfunctional monomer is jointly used with the polymerizable monomer in at least one of the elementary steps of the multistep radical polymerization, therefore the star-shaped structures as obtained in the above way can be bonded to each other through the polyfunctional monomer, when homopolymers of the polymerizable monomers, which are by-products of the radical polymerization (chain polymers resultant from polymerization as not initiated with mercapto groups), might also be bonded to chain polymer segments of the new star-shaped block copolymer through the polyfunctional monomer.

The polyfunctional monomer, as used in the present invention, is a compound having at least two polymerizable unsaturated groups per molecule. A monomer of which the number of the polymerizable unsaturated groups per molecule is 2 is referred to as bifunctional monomer, and a monomer of which the number of the polymerizable unsaturated groups per molecule is 3 is referred to as trifunctional monomer. The polyfunctional monomer, as used in the present invention, needs to be the compound having at least two polymerizable unsaturated groups (i.e. bifunctional or more polyfunctional monomer) in view of bonding the block copolymers to each other, but it is generally preferable that the number of the polymerizable unsaturated groups is not too large, for example, the bi- or trifunctional monomer is preferably used, because compounds having at least four polymerizable unsaturated groups might be considered more preferable in view of increasing the number of the bonding structures to bond the block copolymers to each other, but because when the number of the polymerizable unsaturated groups is not smaller than 4, the resultant polymer would form a network structure to easily become a gel during the polymerization.

Examples of the polyfunctional monomer include: diester compounds as formed from diols and (meth)acrylic acid, such as ethylene glycol di(meth)acrylate, polyethylene glycol di(meth)acrylate, propylene glycol di(meth)acrylate, polypropylene glycol di(meth)acrylate, 1,3-butylene glycol di(meth)acrylate, 1,6-hexanediol di(meth)acrylate, neopentyl glycol di(meth)acrylate, 2-hydroxy-1,3-di(meth) acryloxypropane, 2,2-bis[4-(acryloxyethoxy)phenyl] propane, 2,2-bis[4-(methacryloxyethoxy)phenyl]propane, 2,2-bis[4-(acryloxypolyethoxy)phenyl]propane, 2,2-bis[4-(methacryloxypolyethoxy)phenyl)]propane, and 2-hydroxy-1-acryloxy-3-methacryloxypropane; polyester compounds as formed from compounds having at least three hydroxyl groups per molecule and (meth)acrylic acid, such as trimethylolpropane tri(meth)acrylate, tetramethylolmethane tri (meth)acrylate, tetramethylolmethane tetra(meth)acrylate, pentaerythritol tetrakis(meth)acrylate, and dipentaerythritol hexakis(meth)acrylate; allyl (meth)acrylate; and divinylbenzene. These may be used either alone respectively or in combinations with each other.

Other raw materials are not especially limited, but those which are used in conventional production processes for star-shaped block copolymers may be used without modification, and general production conditions also can be followed without modification. Hereinafter, these are exemplified.

Examples of the polyvalent mercaptan, as used in the present invention, include: diesters as formed from diols (e.g. ethylene glycol and 1,4-butanediol) and carboxyl-group-containing mercaptans, such as ethylene glycol dithioglycolate, ethylene glycol dithiopropionate, 1,4-butanediol dithioglycolate, and 1,4-butanediol dithiopropionate; triesters as formed from triols (e.g. trimethylolpropane) and carboxyl-group-containing mercaptans, such as trimethylolpropane trithioglycolate and trimethylolpropane trithiopropionate; polyesters as formed from compounds having four hydroxyl groups (e.g. pentaerythritol) and carboxyl-group-containing mercaptans, such as pentaerythritol tetrakisthioglycolate and pentaerythritol tetrakisthiopropionate; polyester compounds as formed from compounds having six hydroxyl groups (e.g. dipentaerythritol) and carboxyl-group-containing mercaptans, such as dipentaerythritol hexakisthioglycolate and dipentaerythritol hexakisthiopropionate; polyester compounds as formed from other compounds having at least three hydroxyl groups and carboxyl-group-containing mercaptans; compounds having at least three mercapto groups, such as trithioglycerol; triazine polythiols, such as 2-di-n-butylamino-4,6-dimercapto-S-triazine and 2,4,6-trimercapto-S-triazine; compounds as obtained by adding hydrogen sulfide to a plurality of epoxy groups of polyvalent epoxy compounds to thereby introduce a plurality of mercapto groups; ester compounds as obtained by esterifying a plurality of carboxyl groups of polyvalent carboxylic acids with mercaptoethanol. These may be used either alone respectively or in combinations with each other. Herein, the carboxyl-group-containing mercaptans are compounds having one mercapto group and one carboxyl group, such as thioglycolic acid, mercaptopropionic acid, and thiosalicylic acid.

In the production process according to the present invention, the weight ratio of the polyfunctional monomer to the polyvalent mercaptan (weight of polyfunctional monomer/weight of polyvalent mercaptan) is preferably less than 2, more preferably in the range of 0.05 to 1 both inclusive. Because, in the case where this weight ratio is not less than 2, the number of polyfunctional monomer units as included per molecule of the block copolymer is so large that the resultant polymer might form a network structure to become a gel during the polymerization.

As to the polymerizable monomer as used in the present invention, any polymerizable monomer is available if it is to form a homopolymer or copolymer by radical polymerization. Examples thereof include: (meth)acrylic acid; (meth)acrylates, typically, such as alkyl (meth)acrylates having 1 to 30 carbon atoms, hydroxyethyl (meth)acrylate, hydroxypropyl (meth)acrylate, glycidyl (meth)acrylate, methoxyethyl (meth)acrylate, ethoxyethyl (meth)acrylate, and ethoxyethoxyethyl (meth)acrylate; styrenic monomers, typically, such as x-methylstyrene, vinyltoluene, and styrene; maleimide monomers, typically, such as phenylmaleimide and cyclohexylmaleimide; vinyl ether monomers, typically, such as methyl vinyl ether, ethyl vinyl ether, and isobutyl vinyl ether; fumaric acid, monoalkyl fumarates, dialkyl fumarates; maleic acid, monoalkyl maleates, dialkyl maleates; itaconic acid, monoalkyl itaconates, dialkyl itaconates; (meth)acrylonitrile, butadiene, isoprene, vinyl chloride, vinylidene chloride, vinyl acetate, vinyl ketones, vinylpyridine, vinylpyrrolidone, and vinylcarbazole. These may be used either alone respectively or in combinations with each other. Herein, the different polymerizable monomers mean not only polymerizable monomers having different chemical structures, but also combinations of polymerizable monomers having the same chemical structure, but different mixing ratios.

In the production process according to the present invention, the weight ratio of the polyfunctional monomer to the polymerizable monomers (weight of polyfunctional monomer/total of polymerizable monomers) is preferably less than 0.05, more preferably in the range of 0.001 to 0.01, but not including 0.01. Because, in the case where this weight ratio is not less than 0.05, the viscosity during the production is high unfavorably for the productivity, and because, in the case where the above weight ratio is further increased, the resultant polymer might form a network structure to become a gel during the polymerization. Herein, the total of the polymerizable monomers is the total of the weights of the polymerizable monomers as used in their respective radical polymerization steps.

In the production process according to the present invention, the joint use of the polyfunctional monomer with the polymerizable monomer may be involved in one or more unspecific steps among the elementary steps of the multistep radical polymerization, but is, preferably, only in the first radical polymerization step. Because the case of the addition of the polyfunctional monomer not earlier than the second radical polymerization step is disadvantageous when compared with the case of the addition of the polyfunctional monomer in the first radical polymerization step as follows: the range of the amount of the polyfunctional monomer to give the block copolymer without gelation is narrower, and further, as the amount of the addition is increased, the molecular weight more greatly increases and it is therefore difficult to control the molecular weight. Also as to the properties of the resultant polymer, the case of the addition in the first radical polymerization step provides more excellent results when compared with the case of the addition not earlier than the second radical polymerization step.

In the production process for the new star-shaped block copolymer, according to the present invention, it is necessary that the second radical polymerization step among the elementary steps of the multistep radical polymerization includes the steps of: all at once mixing a polymer solution, resultant from the first radical polymerization step, with a polymerizable monomer which is to be used in the second radical polymerization step; and then polymerizing the resultant mixture, or that the second radical polymerization step among the elementary steps of the multistep radical polymerization includes the step of gradually adding a polymer solution, resultant from the first radical polymerization step, and a polymerizable monomer, which is to be used in the second radical polymerization step, to a vessel to mix them, while polymerizing the resultant mixture. If such a mixing method is carried out, the polymer solution resultant from the first radical polymerization step will be uniformly mixed with the polymerizable monomer which is to be used in the second radical polymerization step.

This second radical polymerization step needs to be carried out in the presence of the polyfunctional monomer. More specifically, it may be carried out as follows: the polymer solution resultant from the first radical polymerization step is uniformly mixed with the polymerizable monomer, which is to be used in the second radical polymerization step, and with the polyfunctional monomer, and then the polymerization is carried out in a polymerization vessel while the resultant mixture is dropwise added thereto; or the polymerization is carried out in a polymerization vessel while each of the polymer solution, resultant from the first radical polymerization step, the polymerizable monomer, which is to be used in the second radical polymerization step, and the polyfunctional monomer is uniformly dropwise added to the polymerization vessel.

During the above all-at-once mixing or addition mixing, it is preferable that the progress of the polymerization of the polymer solution resultant from the first radical polymerization step is terminated. Examples of methods to terminate the polymerization include methods in which a polymerization inhibitor is added to the polymer solution resultant from the first radical polymerization step, or the temperature of the polymer solution is lowered.

Examples of the above polymerization inhibitor, as used to terminate the polymerization, include: phenols such as hydroquinone, 2,5-bis(1,1,3,3-tetramethylbutyl)hydroquinone, 2,5-bis(1,1-dimethylbutyl)hydroquinone, methoxyphenol, 6-tertiary-butyl-2,4-xylenol, and 3,5-di-tertiary-butylcatechol; N-nitrosophenylhydroxylamine aluminum salt, and phenothiazine. These may be used either alone respectively or in combinations with each other. The amount of the polymerization inhibitor, as used, is usually in the range of 1 to 10,000 ppm, preferably 10 to 1,000 ppm, more preferably 20 to 200 ppm, of the polymerizable monomer as used in the first radical polymerization step. In the case where the amount of the polymerization inhibitor, as used, is smaller than 1 ppm, it might be impossible to efficiently terminate the polymerization. On the other hand, in the case where the amount of the polymerization inhibitor, as used, is larger than 10,000 ppm, the polymerization in the second radical polymerization step might not be initiated.

The polymerization in the first radical polymerization step can substantially be terminated if the temperature of the polymer solution is lowered to not higher than 40° C. The reason therefor is that the decomposition rate of the polymerization initiator depends on the temperature, therefore it is considered that almost no radical forms if the temperature of the polymer solution falls down to not higher than 40° C. The depression of the temperature of the polymer solution to not higher than 20° C is enough to more surely terminate the polymerization.

The above polymerization process by which the present invention is featured, namely, the process comprising the steps of mixing the polymer solution, resultant from the first radical polymerization step, with the polymerizable monomer, which is to be used in the second radical polymerization step, and then polymerizing the resultant mixture in the second radical polymerization step, can give a higher functional new star-shaped block copolymer than conventional polymerization processes comprising the step of adding in sequence the polymerizable monomer, which is to be used in the second radical polymerization step, to the entire polymer solution resultant from the first radical polymerization step. Specifically, the above process according to the present invention can easily and surely give the new star-shaped block copolymer that exhibits the holding power, as defined above (adhesion area=1.27 cm×1.27 cm; temperature=60° C.), of not less than 100 minutes, usually not less than 1,000 minutes. Therefore, does not only this new star-shaped block copolymer have a viscosity that is not so high, but also exhibits extremely high heat resistance at high temperature. Accordingly, this polymer is, for example, extremely useful to obtain a hot-melt pressure sensitive adhesive having high holding power.

The reason why the high functional star-shaped block copolymer is obtainable by this new polymerization process is not certain, but is inferred to be that the polymerization process by which the present invention is featured enhances the ratio of formation of the new star-shaped block copolymer as shown in FIG. 1.

In the production process according to the present invention, the radical polymerization may be carried out by conventional radical polymerization methods such as bulk polymerization, solution polymerization, suspension polymerization, and emulsion polymerization. The polymerization temperature is preferably in the range of 30 to 200° C., more preferably 50 to 150° C. For the polymerization, there may be used conventional polymerization initiators, for example: azo initiators such as 2,2'-azobisisobutyronitrile and 2,2'-azobis(2-methylbutyronitrile); and peroxide polymerization initiators such as benzoyl peroxide. The amount of the polymerization initiator as used is preferably not larger than ⅓, more preferably not larger than ⅕, in terms of weight ratio to the polyvalent mercaptan. Because, in the case where the polymerization initiator is used in an amount larger than the above ratio, not only the polymer segments which are extended from the polyvalent mercaptan segment, but also a large amount of polymers which are extended from the polymerization initiator are formed, thus easily lowering the production efficiency of the block copolymer, and further easily deteriorating the properties of the resultant block copolymer.

The procedure to add the polymerizable monomer is not especially limited, but, in the case of the two-step process, it is carried out as follows: in the presence of the polyvalent mercaptan, radical polymerization of a first polymerizable monomer is first carried out, and then, after the conversion in the first step has reached not less than 50%, preferably not less than 80%, a second polymerizable monomer is added to carry out polymerization in the second step (final step). The reason why the conversion of the first radical polymerization is caused to reach not less than 50% is that, even if the next polymerization step is carried out without eliminating the residual polymerizable monomer after the first step, the properties of each chain polymer segment of the block copolymer can be made different, therefore the polymerizable monomer can be eliminated by volatilization after the final step.

(Effects and Advantages of the Invention):

Because the new star-shaped block copolymer, according to the present invention, has a structure in which star-shaped structures are bonded to each other at their chain polymer segments, this polymer can exhibit higher heat resistance even without increasing its molecular weight.

Because the production process for a star-shaped block copolymer, according to the present invention, involves the joint use of a polyfunctional monomer with the polymerizable monomer as monomers when producing the star-shaped block copolymer, this process bonds the resultant star-shaped structures to each other through the polyfunctional monomer, thereby easily giving the above new star-shaped block copolymer according to the present invention. Furthermore, in this process, homopolymers of polymerizable monomers, which are by-products, might get bonded to chain polymer segments of the star-shaped block copolymer through the polyfunctional monomer, therefore there is a possibility that the amount of the formation of the homopolymers could be reduced, so that the deterioration of the properties as caused by the homopolymers could also be prevented.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples.

Hereinafter, unless otherwise noted, the units "%" and "part(s)" are by weight. Incidentally, the number-average molecular weight (Mn) and the weight-average molecular weight (Mw) were determined in terms of polystyrene by gel permeation chromatography (GPC).

The properties of the hot-melt pressure sensitive adhesive were measured in the following way.

Sample: as prepared by melt-coating the hot-melt pressure sensitive adhesive in a thickness of 25 $\mu$m onto a 38-$\mu$m-thick PET film with a GPD coater (made by Yuri Roll Machine Co., Ltd.).

Probe tack: as measured with a probe tack tester (made by Nichiban Co., Ltd.) under conditions of: measurement temperature=23° C.; contact period=1 second; peeling rate=1 cm/second.

180°-peel strength: as measured by a process including the steps of: attaching the sample of 25 mm in width onto a stainless steel material (adherend); and then pressing the sample by running a 2-kg-heavy roller thereon back and forth once; and, 20 minutes later, peeling off the sample from the stainless steel material at an angle of 180° and a tensile rate of 300 mm/minute under conditions of: measurement temperature=23° C.; relative humidity=60%.

Holding power: as determined by a process including the steps of: attaching the sample onto a stainless steel sheet such that the adhesion area would be a predetermined value (1.27 cm×1.27 cm or 2.54 cm×2.54 cm); and then pressing the sample onto the stainless steel sheet by running a 2-kg-heavy roller thereon back and forth once; and then adjusting the temperature of the product to a predetermined temperature (60 or 80° C.) for 30 minutes; and then applying a load of 1 kg to the sample; and then measuring how long the sample has not fallen off from the stainless steel sheet since the application of the load, or measuring to what degree (unit: mm) the position of the attached sample on the stainless steel sheet has varied in the case where the sample has not fallen off from the stainless steel sheet even if 24 hours have passed since the application of the load.

In the tables to show the measurement results, the portions as marked with "#1", "#2", and "#3" show the results of the measurement in which the adhesion area was set to be 2.54 cm×2.54 cm in both cases of "#1" and "#2", but the adjusted temperature was set to be 60° C. in the case of "#1", and 80° C. in the case of "#2", and further, the adhesion area was set to be 1.27 cm×1.27 cm in the case of "#3", and the adjusted temperature was set to be 60° C. in the case of "#3".

As to the hot-melt pressure sensitive adhesive, those which have a viscosity of not higher than 50,000 cps at 180° C. and a great holding power at 80° C. (good heat resistance) are demanded.

EXAMPLE 1
First Radical Polymerization Step:

First, 177.3 g of methyl methacrylate, 1.8 g of acrylic acid (both as first (polymerizable) monomers), 0.9 g of tetraethylene glycol diacrylate (as polyfunctional monomer) (made by Shin-Nakamura Chemical Industrial Co., Ltd.; hereinafter abbreviated as TEGDA), and 140 g of ethyl acetate (as solvent) were placed into a four-necked flask of 2 liters as equipped with a stirrer, a nitrogen-introducing tube, dropping funnels, a thermometer, and a condenser, and the internal temperature of the flask was then elevated to 85° C. under nitrogen atmosphere. Then, after the internal temperature had reached 85° C., 3 g of pentaerythritol tetrakisthioglycolate (as polyvalent mercaptan), 0.6 g of 2,2'-azobis(2-methylbutyronitrile) (as radical polymerization initiator) (trade name: ABN-E, made by Japan Hydrazine Co., Inc.; hereinafter abbreviated as ABN-E), 20 g of ethyl acetate (as solvent) were added to initiate polymerization. At each of 50 minutes and 80 minutes later than the initiation of the polymerization, 1.5 g of pentaerythritol tetrakisthioglycolate (as polyvalent mercaptan), 0.3 g of ABN-E (as radical polymerization initiator), and 10 g of ethyl acetate (as solvent) were added. One hundred and forty minutes later, the conversion of methyl methacrylate reached 84.9%.

Second Radical Polymerization Step:

Then, 415.8 g of butyl acrylate, 4.2 g of acrylic acid (both as second (polymerizable) monomers), and 400 g of ethyl acetate (as solvent) were dropwise added from the dropping funnels to the resultant reaction solution over a 2-hour period. At each of 30 minutes and 60 minutes later than the completion of the dropwise addition, 0.2 g of ABN-E (as radical polymerization initiator) and 5 g of ethyl acetate (as solvent) were added. Another 60 minutes later, 0.6 g of azobisisobutyronitrile (as radical polymerization initiator) (trade name: ABN-R, made by Japan Hydrazine Co., Inc.) and 10 g of ethyl acetate (as solvent) were added. The reaction solution was reacted under reflux for another 2 hours and then cooled down to room temperature to end the reaction.

Post-treatment Step:

Volatile components, such as ethyl acetate (solvent) and residual monomers, were removed from the resultant reaction solution with a twin-screw extruder, thus obtaining a colorless transparent star-shaped block copolymer.

Measurement:

The resultant polymer had a number-average molecular weight (Mn) of 29,500 and a weight-average molecular weight (Mw) of 156,000. This star-shaped block copolymer itself was regarded as a hot-melt pressure sensitive adhesive. The pressure sensitive adhesive properties thereof are shown in Table 1.

EXAMPLES 2 TO 7

Star-shaped block copolymers were obtained in the same way as of Example 1 except that the types of the first and second monomers, the amount of the polyvalent mercaptan, the type and amount of the polyfunctional monomer, and what the polyfunctional monomer was jointly used with were changed to those of Tables 1 and 2, which further show the properties of the resultant polymers as measured in the same way as above.

EXAMPLE 8

This is an example in which the all-at-once mixing was carried out and the polyfunctional monomer was used both in the first and second radical polymerization steps.

First Radical Polymerization Step:

This was carried out in the same way as of Example 1.

Second Radical Polymerization Step:

Next, 415. 8 g of butyl acrylate, 4.2 g of acrylic acid (both as second (polymerizable) monomers), 0.9 g of TEGDA (as polyfunctional monomer), and 0.6 g of ABN-E (as radical polymerization initiator) were added to a polymer solution, resultant from the first radical polymerization step, to prepare a mixed solution.

Next, 400 g of ethyl acetate (as solvent) was placed into another flask and then heated to 80° C. so as to be refluxed. Then, 30% of the mixed solution as obtained above was added into this ethyl acetate under reflux to initiate the second radical polymerization reaction.

After 10 minutes from the initiation of the reaction, the rest of the mixed solution was dropwise added over a 2-hour period.

At each of 30 minutes and 60 minutes later than the completion of the dropwise addition, 0.2 g of ABN-E (as radical polymerization initiator) and 5 g of ethyl acetate (as solvent) were added. The reaction solution was reacted under reflux for another 2 hours to end the polymerization.

Post-treatment Step:

Volatile components, such as ethyl acetate (solvent) and residual monomers, were removed from the resultant reaction solution with a twin-screw extruder, thus obtaining a colorless transparent star-shaped block copolymer.

Measurement:

The resultant star-shaped block copolymer had a number-average molecular weight (Mn) of 31,000 and a weight-average molecular weight (Mw) of 241,000. This star-shaped block copolymer itself was regarded as a hot-melt pressure sensitive adhesive. The pressure sensitive adhesive aproperties thereof are shown in Table 3.

EXAMPLE 9

This is an example in which the all-at-once mixing was carried out and the polyfunctional monomer was used only in the second radical polymerization step.

A star-shaped block copolymer was obtained in the same way as of Example 8 except that the TEGDA (as polyfunctional monomer) was not used in the first radical polymerization step.

The pressure sensitive adhesive properties of this star-shaped block copolymer are shown in Table 3.

EXAMPLE 10

This is an example in which the addition mixing was carried out and the polyfunctional monomer was used both in the first and second radical polymerization steps.

The polymer solution, resultant from the same first radical polymerization step as of Example 1, was subjected to the second radical polymerization step as follows:

First, 415. 8 g of butyl acrylate, 4.2 g of acrylic acid (both as second (polymerizable) monomers), 0.9 g of TEGDA (as polyfunctional monomer), and 0.6 g of ABN-E (as radical polymerization initiator) were mixed to prepare a polymerizable monomer solution which was to be used in the second radical polymerization step.

Next, 400 g of ethyl acetate (as solvent) was placed into another flask and then heated to 80° C. so as to be refluxed. Then, 30% of the above polymer solution, resultant from the first radical polymerization step, and 30% of the polymerizable monomer solution, as prepared above, were separately added into this ethyl acetate under reflux to initiate the second radical polymerization reaction. After 10 minutes from the initiation of the reaction, the rest of the above polymer solution and the above polymerizable monomer solution were dropwise added over a 2-hour period.

At each of 30 minutes and 60 minutes later than the completion of the dropwise addition, 0.2 g of ABN-E (as radical polymerization initiator) and 5 g of ethyl acetate (as solvent) were added. The reaction solution was reacted under reflux for another 2 hours to end the second radical polymerization step.

Thereafter, the procedure was carried out in the same way as of Example 8, thus obtaining a star-shaped block copolymer.

The pressure sensitive adhesive properties of this star-shaped block copolymer are shown in Table 3.

COMPARATIVE EXAMPLES 1 AND 2

Star-shaped block copolymers were obtained in the same way as of Example 1 except that the addition of the polyfunctional monomer was omitted. The properties of the resultant polymers as measured in the same way as above are shown in Table 4. The star-shaped block copolymer as obtained in Comparative Example 2 had a higher molecular weight than that obtained in Comparative Example 1.

TABLE 1

| | | | Example 1 | Example 2 | Example 3 | Example 4 |
|---|---|---|---|---|---|---|
| Composition of polymer | First monomer | Methyl methacrylate | 177.3 | 176.4 | 169.2 | 146.5 |
| | | Acrylic acid | 1.8 | 1.8 | 1.8 | 1.5 |
| | Second monomer | Ethyl acrylate | — | — | — | 168.8 |
| | | Butyl acrylate | 415.8 | 199.5 | 415.8 | 168.8 |
| | | 2-Ethylhexyl acrylate | — | 199.5 | — | 112.4 |
| | | Acrylic acid | 4.2 | 21 | 4.2 | — |
| | Polyvalent mercaptan (parts) | | 6 | 6 | 8 | 5.4 |
| | Polyfunctional monomer (parts) | | TEGDA[1] 0.9 | TEGDA[1] 1.8 | TEGDA[1] 9 | NK Ester A-400[2] 2 |
| | Step(s) in which polyfunctional monomer is used | | First step | First step | First step | First step |
| | Polyfunctional monomer/ all monomers (wt) | | 0.0015 | 0.003 | 0.015 | 0.0033 |
| | Polyfunctional monomer/ polyvalent mercaptan (wt) | | 0.15 | 0.3 | 1.13 | 0.37 |
| Properties of polymer | Number-average molecular weight (Mn) | | 29,500 | 30,100 | 21,100 | 34,000 |
| | Weight-average molecular weight (Mw) | | 156,000 | 190,000 | 219,000 | 282,000 |
| | Probe tack (gf) | | 700 | 570 | 610 | 640 |
| | 180°-peel strength (g/25 mm) | | 820 | 610 | 750 | 860 |
| | Holding power[3] (mm, minutes) | #1 | (0 mm) | (0 mm) | (0 mm) | (0 mm) |
| | | #2 | 610 minutes | (0.1 mm) | 134 minutes | 320 minutes |
| | | #3 | 12 minutes | — | — | — |
| | Viscosity (cps) at 180° C. | | 30,500 | 29,500 | 33,300 | 27,100 |

[1]Tetraethylene glycol diacrylate (made by Shin-Nakamura Chemical Industrial Co., Ltd.)
[2]Polyethylene glycol diacrylate (made by Shin-Nakamura Cbemical Industrial Co., Ltd.)
[3]The numerical values in the parentheses show to what degree the samples slipped in 24 hours, and the other cases show when the samples fell off.

TABLE 2

| | | | Example 5 | Example 6 | Example 7 |
|---|---|---|---|---|---|
| Composition of polymer | First monomer | Methyl methacrylate | 125 | 177.3 | 177.3 |
| | | Cyclohexylmaleimide | 53.6 | — | — |
| | | Acrylic acid | — | 1.8 | 1.8 |
| | Second monomer | Butyl acrylate | 420 | 415.8 | 415.8 |
| | | Acrylic acid | — | 4.2 | 4.2 |
| | Polyvalent mercaptan (parts) | | 6 | 6 | 8 |
| | Polyfunctional monomer (parts) | | NK Ester 4G[4] 1.4 | TMPTA[5] 0.6 | TEGDA[1] 0.9 |
| | Step(s) in which polyfunctional monomer is used | | First step | First step | Second step |
| | Polyfunctional monomer/ all momomers (wt) | | 0.0023 | 0.001 | 0.0015 |
| | Polyfunctional monomer/ polyvalent mercaptan (wt) | | 0.23 | 0.1 | 0.15 |
| Properties of polymer | Number-average molecular weight (Mn) | | 28,200 | 30,700 | 28,600 |
| | Weight-average molecular weight (Mw) | | 172,000 | 163,000 | 269,000 |
| | probe tack (gf) | | 590 | 680 | 770 |
| | 180°-peel strength (g/25 mm) | | 830 | 800 | 790 |
| | Holding power[3] (mm, minutes) | #1 | (0 mm) | (0 mm) | (0 mm) |
| | | #2 | 300 minutes | 228 minutes | 174 minutes |
| | | #3 | — | — | 10 minutes |
| | Viscosity (cps) at 180° C. | | 14,500 | 18,900 | 27,500 |

[1] Tetraethylene glycol diacrylate (made by Shin-Nakamura Chemical Industrial Co., Ltd.)
[3] The numerical values in the parentheses show to what degree the samples slipped in 24 hours, and the other cases show when the samples fell off.
[4] Polyethylene glycol diacrylate (made by Shin-Nakamura Chemical Industrial Co., Ltd.)
[5] Trimethylolpropane triacrylate (made by Nippon Shokubai Co., Ltd.)

TABLE 3

| | | | Example 8 | Example 9 | Example 10 |
|---|---|---|---|---|---|
| Composition of polymer | First monomer | Methyl methacrylate | 177.3 | 177.3 | 177.3 |
| | | Acrylic acid | 1.8 | 1.8 | 1.8 |
| | Second monomer | Ethyl acrylate | — | — | — |
| | | Butyl acrylate | 415.8 | 415.8 | 415.8 |
| | | 2-Ethylhexyl acrylate | — | — | — |
| | | Acrylic acid | 4.2 | 4.2 | 4.2 |
| | Polyvalent mercaptan (parts) | | 6 | 6 | 6 |
| | Polyfunctional monomer (parts) | | TEGDA[1] 0.9 + 0.9 | TEGDA[1] 0.9 | TEGDA[1] 0.9 + 0.9 |
| | Step(s) in which polyfunctional monomer is used | | First step and second step | Second step | First step and second step |
| | Polyfunctional monomer/ all monomers (wt) | | 0.003 | 0.0015 | 0.003 |
| | Polyfunctional monomer/ polyvalent mercaptan (wt) | | 0.3 | 0.15 | 0.3 |
| Properties of polymer | Number-average molecular weight (Mn) | | 31,000 | 26,700 | 29,800 |
| | Weight-average molecular weight (Mw) | | 241,000 | 216,000 | 239,000 |
| | Probe tack (gf) | | 610 | 650 | 630 |
| | 180°-peel strength (g/25 mm) | | 730 | 790 | 750 |
| | Holding power[3] (mm, minutes) | #1 | (0 mm) | (0 mm) | (0 mm) |
| | | #2 | (0 mm) | (0.1 mm) | (0 mm) |
| | | #3 | (0.1 mm) | 420 minutes | (0.2 mm) |
| | Viscosity (cps) at 180° C. | | 45,700 | 33,400 | 39,800 |

[1] Tetraethylene glycol diacrylate (made by Shin-Nakamura Chemical Industrial Co., Ltd.)
[3] The numerical values in the parentheses show to what degree the samples slipped in 24 hours, and the other cases show when the samples fell off.

TABLE 4

|  |  |  | Comparative Example 1 | Comparative Example 2 |
|---|---|---|---|---|
| Composition of polymer | First monomer | Methyl methacrylate | 177.3 | 177.3 |
|  |  | Acrylic acid | 1.8 | 1.8 |
|  | Second monomer | Butyl acrylate | 415.8 | 415.8 |
|  |  | Acrylic acid | 4.2 | 4.2 |
|  | Polyvalent mercaptan (parts) |  | 4.2 | 3.6 |
|  | Polyfunctional monomer (parts) |  | — | — |
|  | Step(s) in which polyfunctional monomer is used |  | — | — |
|  | Polyfunctional monomer/ all monomers (wt) |  | — | — |
|  | Polyfunctional monomer/ polyvalent mercaptan (wt) |  | — | — |
| Properties of polymer | Number-average molecular weight (Mn) |  | 36,100 | 37,000 |
|  | Weight-average molecular weight (Mw) |  | 183,000 | 255,000 |
|  | Probe tack (gf) |  | 750 | 600 |
|  | 180°-peel strength (g/25 mm) |  | 980 | 810 |
|  | Holding power[3] (mm, minutes) | #1 | (0.1 mnn) | (0 mm) |
|  |  | #2 | 70 minutes | 201 minutes |
|  |  | #3 | — | — |
|  | Viscosity (cps) at 180° C. |  | 26,700 | 97,300 |

[1)]Tetraethylene glycol diacrylate (made by Shin-Nakamura Chemical Industrial Co., Ltd.)
[3)]The numerical values in the parentheses show to what degree the samples slipped in 24 hours, and the other cases show when the samples fell off.

As is evident from the results of the measurement of the viscosity at 180° C. and the holding power of the star-shaped block copolymers of Examples 1 to 7 and Comparative Example 1, the new star-shaped block copolymers according to the present invention have higher holding power despite having almost the same viscosity at 180° C. when compared with the conventional one.

From the comparison of the molecular weight, the viscosity at 180° C., and the holding power of the star-shaped block copolymer of Comparative Example 1 with those of Comparative Example 2, it would be understood that, as to the conventional star-shaped block copolymers, when the molecular weight is increased, the holding power is enhanced in some degree, but the viscosity at 180° C. greatly increases. On the other hand, when compared with the star-shaped block copolymer of Comparative Example 2, that of Example 1 has a lower viscosity at 180° C., but a much greater holding power. From these measurement results and the polymerizability of the polyfunctional monomer, it would be understood that the new star-shaped block copolymers of the Examples have a structure in which star-shaped structures are bonded to each other.

Both in Examples 1 and 7, the star-shaped block copolymers were obtained by the multistep radical polymerization involving the use of the polyvalent mercaptan. Examples 1 and 7 are only different from Examples 8 to 10 in that, in Examples 1 and 7, the uniform mixing of the polymer solution, resultant from the first radical polymerization step, with the polymerizable monomer, which is to be used in the second radical polymerization step, is not carried out in the second radical polymerization step.

From the comparison of Example 8 with Example 1 and the comparison of Example 9 with Example 7 in respect to the holding powers #1 and #2, it would be understood that the holding power greatly falls down when the temperature becomes high in Examples 1 and 7, whereas the new star-shaped block copolymers of Examples 8 and 9 exhibit high holding power even if the temperature becomes high.

Incidentally, the values of the viscosity at 180° C. in Examples 8 and 9 are a little higher than those in Examples 1 and 7, but, if the viscosity at 180° C. is not higher than 50,000 cps, there is no problem in practical use, for example, for hot-melt pressure sensitive adhesives.

From the comparison of Example 8 with Example 1 and the comparison of Example 9 with Example 7 in respect to the holding power #3 in the above tables, it would be still better understood that when the adhesion area is reduced to a quarter, falling-off occurs after several minutes even at 60° C. in Examples 1 and 7, whereas the new star-shaped block copolymers of Examples 8 and 9 exhibit high holding power without causing the falling-off even after 24 hours.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A new star-shaped block copolymer, comprising a plurality of star-shaped structures in which at least three chain polymer segments are radially extended from a central polyvalent mercaptan segment, wherein one of said at least three chain polymer segments comprises a bonding portion derived from a polyfunctional monomer having at least two polymerizable unsaturated groups per molecule, wherein said bonding portion of one chain polymer segment of a first star-shaped structure is bonded to said bonding portion of one chain polymer segment of a second star-shaped structure.

2. A new star-shaped block copolymer according to claim 1, which has a holding power of not less than 100 minutes, wherein the holding power is determined by a process including the steps of: preparing a sample by melt-coating a hot-melt pressure sensitive adhesive in a thickness of 25 μm onto a 38-μm-thick PET film, wherein the hot-melt pressure sensitive adhesive includes the star-shaped block copolymer; and then attaching the sample onto a stainless steel sheet such that the adhesion area would be 1.27 cm×1.27 cm; and then pressing the sample onto the stainless steel sheet by running a 2-kg-heavy roller thereon back and forth once; and then adjusting the temperature of the product to 60° C. for 30 minutes; and then applying a load of 1 kg to the sample; and then measuring how long the sample has not fallen off from the stainless steel sheet since the application of the load.

3. A new star-shaped block copolymer according to claim 2, wherein the holding power is not less than 1,000 minutes.

4. A process for producing a new star-shaped block copolymer, comprising the multistep radical polymerization in the presence of a polyvalent mercaptan wherein the elementary steps of the multistep radical polymerization differ in polymerizable monomers as used therein, with the production process being characterized in that at least one of the elementary steps of the multistep radical polymerization involves the joint use of a polyfinctional monomer with the polymerizable monomer, with the polyflinctional monomer having at least two polymerizable unsaturated groups per molecule.

5. A process according to claim 4, wherein the weight ratio of the polyfunctional monomer to the polyvalent mercaptan (weight of polyfunctional monomer/weight of polyvalent mercaptan) is less than 2.

6. A process according to claim 4, wherein the weight ratio of the polyfunctional monomer to the total of the polymerizable monomers (weight of polyfunctional monomer/total weight of polymerizable monomers) is less than 0.05.

7. A process according to claim 4, wherein the joint use of the polyfunctional monomer with the polymerizable monomer is involved only in the first radical polymerization step among the elementary steps of the multistep radical polymerization.

8. A process according to claim 4, wherein the second radical polymerization step among the elementary steps of the multistep radical polymerization includes the steps of: all at once mixing a polymer solution, resultant from the first radical polymerization step, with a polymerizable monomer which is to be used in the second radical polymerization step; and then polymerizing the resultant mixture in the presence of the polyfinctional monomer.

9. A process according to claim 4, wherein the second radical polymerization step among the elementary steps of the multistep radical polymerization includes the step of gradually adding a polymer solution, resultant from the first radical polymerization step, and a polymerizable monomer, which is to be used in the second radical polymerization step, to a vessel to mix them, while polymerizing the resultant mixture in the presence of the polyfunctional monomer.

10. A new star-shaped block copolymer, comprising:

a) a first star-shaped structure having at least three chain polymer segments radially extending from a central polyvalent mercaptan segment, with one of said chain polymer segments having a first bonding structural portion;

b) a second star-shaped structure having at least three chain polymer segments radially extending from a central polyvalent mercaptan segment, with one of said chain polymer segments having a second bonding structural portion; and c) wherein the first and second bonding structural portions are bonded to each other, wherein each of the first and second bonding structure portions is derived from a polyfunctional monomer having at least two polymerizable unsaturated groups per molecule.

* * * * *